United States Patent [19]
Kometani et al.

[11] Patent Number: 4,461,871
[45] Date of Patent: Jul. 24, 1984

[54] POLYESTER RESINOUS COMPOSITION, MOLDED ARTICLES AND PROCESS FOR PREPARATION THEREOF

[75] Inventors: Kiichi Kometani, Nagoya; Yoshiyuki Yamamoto, Suzuka; Masana Yanagi, Nagoya, all of Japan

[73] Assignee: Toray Industries, Inc., Tokyo, Japan

[21] Appl. No.: 400,414

[22] Filed: Jul. 21, 1982

[30] Foreign Application Priority Data

Jul. 24, 1981 [JP] Japan ................................ 56-115118

[51] Int. Cl.$^3$ ............................................. C08L 67/02
[52] U.S. Cl. .................................... 525/166; 525/170; 525/108; 525/111; 523/437
[58] Field of Search ....................... 525/111, 108, 166; 523/437

[56] References Cited

U.S. PATENT DOCUMENTS 4,246,378  1/1981  Kometani et al. ................. 525/438

Primary Examiner—John C. Bleutge
Assistant Examiner—Robert E. L. Sellers
Attorney, Agent, or Firm—Austin R. Miller

[57] ABSTRACT

A polyester resinous composition comprising (a) an aromatic polyester, (b) a copolymer of an $\alpha$-olefin and a glycidyl ester of $\alpha,\beta$-ethylenically unsaturated carboxylic acid and (c) an ethylene based copolymer of ethylene and $\alpha$-olefin having more than three carbon atoms. The composition has highly improved impact strength at low temperature and good flow properties upon injection molding. The composition can be molded to form various articles by conventional molding methods.

25 Claims, No Drawings

POLYESTER RESINOUS COMPOSITION, MOLDED ARTICLES AND PROCESS FOR PREPARATION THEREOF

BACKGROUND OF THE INVENTION

The present invention relates to a polyester resinous composition and more particularly to a resinous composition having highly improved impact strength at low temperature and good flow properties permitting the composition to be used in injection molding.

DESCRIPTION OF THE PRIOR ART

Aromatic polyesters such as poly(ethylene terephthalate) and poly(butylene terephthalate) have been put to various uses such as manufacture of parts for electrical and electronic equipment, automobiles and the like, because these materials have excellent mechanical and electrical properties. Aromatic polyesters, however, lack impact strength, especially when molded into articles having notches.

Many methods have been proposed to improve this property. Among the methods are blending an aromatic polyester with a copolymer consisting of an α-olefin or a glycidyl ester of α,β-ethylenically unsaturated carboxylic acid and the like, as disclosed in U.S. Pat. No. 4,172,859, U.S. Pat. No. 4,246,378, Japanese Patent Publication (Kokai) No. 52-32045, Japanese Patent Publication (Kokai) No. 53-117,049, which improves impact strength of an aromatic polyester at room temperature. Nevertheless, molded articles prepared by the above-mentioned methods still only have low impact strength at low temperatures, such as −40° C.

Furthermore the flow properties upon injection molding of resinous compositions prepared by the above-mentioned methods are very poor because of high melt viscosity. Hence, still further improvements are required.

SUMMARY OF THE INVENTION

We have now found that the addition to an aromatic polyester resin of specific ethylene based copolymers as well as specific copolymers containing glycidyl groups strikingly improves resin impact strength at low temperature and resin flow properties upon injection molding.

An object of the present invention is to provide a polyester resinous composition having highly improved impact strength at low temperature.

Another object of the present invention is to provide a polyester resinous composition having excellent flow properties upon injection molding.

The present invention relates to a polyester resinous composition including an aromatic polyester component referred to as component (a) of the composition, a copolymer of an α-olefin and a glycidyl ester of α,β-ethylenically unsaturated carboxylic acid, which copolymer therefore has glycidyl groups and is referred to as component (b) of the composition and a copolymer of ethylene and an α-olefin having more than three carbon atoms, which copolymer therfore is ethylene based and is referred to as component (c) of the composition.

DESCRIPTION OF THE PREFERRED EMBODIMENTS

The principal components of the aromatic polyesters forming the (a) component of the present invention are polymers or copolymers prepared by condensing a dicarboxylic acid (or an ester-forming compound thereof) with a glycol (or an ester-forming compound thereof).

Among the dicarboxylic acids suitable for preparing polyesters in accordance with the present invention are the aromatic dicarboxylic acids such as terephthalic acid, isophthalic acid, orthophthalic acid, 2,6-naphthalene dicarboxylic acid, 2,7-naphthalene dicarboxylic acid, 1,5-naphthalene dicarboxylic acid, anthrathene dicarboxylic acid, bis(p-carboxyphenyl) methane, 4,4'-diphenylether dicarboxylic acid, 4,4'-diphenylsulfide dicarboxylic acid, 4,4'-diphenylsulfone dicarboxylic acid, 1,2-bis(4-carboxyphenoxy) ethane, 4,4'-biphenyl dicarboxylic acid, 3,3'-biphenyl dicarboxylic acid, 4,4'''-terphenylene dicarboxylic acid and the like, or ester-forming compounds thereof.

Furthermore, less than 40 mole percent of aliphatic dicarboxylic acids such as adipic acid, sebacic acid, azelaic acid, 1,12-dodecane dioic acid and the like, cycloaliphatic acids such as 1,3-cyclohexanedicarboxylic acid, 1,4-cyclohexanedicarboxylic acid and the like and ester-forming compounds thereof can be copolymerized with an aromatic polyester to provide the first component of the invention.

Glycols suitable for preparing polyesters in accordance with the present invention include aliphatic diols having from 2 to 20 carbon atoms such as ethylene glycol, 1,3-propane diol, 1,2-propane diol, 1,4-butane diol, 1,3-butane diol, 1,5-pentane diol, 1,6-hexane diol, 1,8-octane diol, 1,10-decane diol, neopentyl glycol, 2-methyl-1,3-propane diol, 3-methyl-1,5-pentane diol, 1,3-cyclohexanediol, 1,4-cyclohexanediol, 1,4-cylohexanedimethanol and the like. Mixtures of these glycols can also be employed.

Furthermore, less than 60 weight percent of long chain glycols having molecular weights in the range of about 400–6,000 such as poly(ethylene glycol), poly(1,3-propylene glycol), poly(tetramethylene glycol), and the like can be also copolymerized to produce the (a) component of the invention.

Preferable polyesters are poly(ethylene terephthalate), poly(propylene terephthalate), poly(butylene terephthalate), poly(hexamethylene terephthalate), poly(cyclohexylene dimethylene terephthalate), poly(ethylene-2,6-naphthlate), poly(ethylene 1,2-bis(phenoxy) ethane-p,p'-dicarboxylate) and the like. Among these poly(butylene terephthalate) is preferable because of its excellent mechanical properties.

The polyester component (a) in this invention preferably has a relative viscosity between 1.1 to 1.8 as measured in an o-chlorophenol solution of 0.5 wt. % concentration at 25° C. When the relative viscosity of the polyester component (a) is less than 1.1, the resinous composition does not exhibit sufficient mechanical properties. When the relative viscosity of the polyester component (a) is above 1.8, good surface gloss of the molded article cannot be obtained.

The second component (b) of the invention is a copolymer, containing glycidyl groups, of an α-olefin and a glycidyl ester of α,β-ethylenically unsaturated carboxylic acid. α-olefins in component (b) are unsaturated hydrocarbons having from 2 to 20 carbon atoms and a carbon-carbon double bond in the end group of the molecule. Among the suitable α-olefins are ethylene, propylene, butene-1, hexene-1 and the like. Ethylene is preferable.

Glycidyl esters of α,β-ethylenically unsaturated carboxylic acids utilized in the present invention are of the general formula

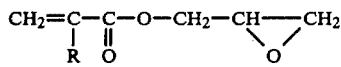

wherein R is hydrogen, a lower alkyl radical such as methyl, ethyl and the like, or a lower alkyl radical having a substituted glycidyl ester radical.

Glycidyl acrylate, glycidyl methacrylate, glycidyl ethacrylate and glycidyl itaconate are examples. Glycidyl methacrylate is preferable.

The copolymers advantageously have a glycidyl unit of α,β-ethylenically unsaturated carboxylic acid content in the range of from 1 to 50 weight percent, more advantageously from 2 to 20 weight percent. Furthermore, unsaturated monomers may be copolymerized with the above-mentioned two monomers within the range of about 40 weight percent. Suitable unsaturated monomers are vinyl esters including vinyl acetate, vinyl propionate and the like, vinyl ethers, esters of acrylic acid and methacrylic acid, acrylonitrile, styrene and its derivatives, carbon monoxide, and the like.

Preferable copolymers employed for the (b) component in the present invention are ethylene/glycidyl methacrylate, ethylene/glycidyl methacrylate/vinyl acetate, ethylene/glycidyl methacrylate/carbon monoxide, ethylene/glycidyl acrylate, ethylene/glycidyl acrylate/vinyl acetate, propylene/glycidyl methacrylate and the like. Among these the ethylene/glycidyl methacrylate copolymer is preferable because of its excellent heat resistance.

The above-mentioned copolymers are preferably used as component (b) in an amount ranging from 1 to 50 parts by weight, more preferably 2 to 40 parts by weight, based on 100 parts by weight of the aromatic polyester used as component (a). When less than 1 part by weight of a copolymer is used as component (b), articles molded from the composition have insufficient low temperature impact strength. However, when the copolymer used as component (b) exceeds 50 parts by weight, the mechanical properties of the composition are apt to be inferior.

Component (c) of the composition of the present invention is an ethylene based copolymer of ethylene and α-olefin having more than three carbon atoms.

α-olefins in component (c) are unsaturated hydrocarbons having more than 3 carbon atoms, selected from the group consisting of propylene, butene-1, pentene-1, 3-methylpentene-1, hexene-1, octacene-1, and the like. Among these butene-1 is preferable.

The molar ratio of ethylene to α-olefin in the component (c) copolymer is preferably in a range between 40/60 to 99/1, more preferably 70/30 to 95/5.

The above-mentioned copolymers are preferably used as component (c) in an amount ranging between 1 to 50 parts by weight, preferably 2 to 40 parts by weight based on 100 parts by weight of the aromatic polyester used as component (a). When less than 1 part by weight of a copolymer is used as component (c), articles molded from the composition have insufficient low temperature impact strength. However, when the copolymer used as component (c) exceeds 50 parts by weight, the mechanical properties of the composition are apt to be impaired.

The sum of the amounts of component (b) and component (c) in the composition preferably ranges from 2 to 50 parts by weight per 100 parts by weight of the aromatic polyester of component (a).

The weight ratio of component (b) to component (c) in the composition of the present invention is preferably between 1/9 and 8/2.

The impact strength of the compositions of the present invention may be modified by addition of compounds which accelerate reactions between epoxy compounds and carboxylic acids or alcohols. Examples of compounds exhibiting this property are tertiary amines such as triphenylamine, 2,4,6-tris(dimethylaminomethyl)-phenol and the like, phosphites such as triphenylphosphites, triisodecylphosphite and the like, phosphonium compounds such as triphenylallylphosphonium bromide and the like, tertiary phosphines such as triphenylphosphine and the like, metallic salts of carboxylic acids such as lithium stearate, calcium stearate, barium stearate and the like, metallic salts of sulfonic acids such as sodium dodecylbenzenesulfonate, sodium 3,5-dicarbomethoxybenzenesulfonate and the like, organic sulfate salts such as sodium lauryl sulfate and the like.

If desired, there may be added to the composition of the present invention various additives such as fibrous or granular reinforcements and fillers including glass fibers, glass beads, carbon fibers, metal fibers, glass flakes, wollastonites, micas, talcs, clays, aluminium oxides, calcium carbonates and the like; antioxidants and stabilizers such as hindered phenols, typical examples of which are "Irganox" 1010, 1076, and 1098 produced by Ciba-Geigy Corp., hydroquinones, phosphites and their derivatives and the combinations thereof; ultraviolet light stabilizers such as resorcinols, salicyclates, benzotriazoles and benzophenones and the like; lubricants and mold release agents selected from stearic acids, stearates, montanic acids, montan wax, montanates, stearyl alcohol, stearamides such as ethylene bis(stearamide) and the like; coloring agents including dyes and pigments such as carbon black, titanium dioxides, cadmium sulfides, phthalocyanines and the like; flame retardants selected from halogen substituted aromatic compounds such as decabromodiphenyl ether, brominates polycarbonates, melamine compounds, cyanuric acid derivatives, phosphorous compounds and the like; flame retarding agents such as antimony trioxides and zirconium oxide; nucleating agents and antiwear agents and the like; all so long as the desired characteristics of the resulting compositions are not deteriorated. More than two of the above-mentioned additives can be used. Further, if desired, there can be added to the composition of the present invention small amounts of other thermoplastic resins such as polyethylenes, polypropylenes, polycarbonates and the like, thermosetting resins such as phenolic resins, melamine resins, epoxy resins and the like, and elastomeric resins such as ethylene/vinyl acetate copolymers, block-copolyetheresters and the like. More than two types of the above-mentioned resins may be added.

Many methods may be used for preparing the resinous compositions of the present invention. Various conventional blending methods can be employed. Mixtures of the three components may preferably be accomplished by extrusion at a temperature above melting point of the aromatic polyester.

The resinous composition of the present invention can be molded according to conventional methods such as extrusion molding, injection molding, blow molding and the like.

Articles of the resinous composition of the present invention have highly improved impact strength at low temperature as well as good flow properties during injection molding.

The present invention is illustrated below in detail with reference to Examples. The Examples are by way of illustration and not by way of limitation.

EXAMPLES 1-4, COMPARATIVE EXAMPLES 1-7

Resinous compositions in accordance with the invention were prepared, each containing 100 parts by weight of an aromatic polyester (poly(butylene terephthalate)) having a relative viscosity of 1.62 which was produced by condensing terephthalic acid as the aromatic carboxylic acid constituent with 1,4-butanediol as the glycol constituent, with proportions illustrated in Table 1. Data for the composition in accordance with the invention appears under the heading "Examples". The components were extruded in a screw extruder at a temperature of 250° C., and the extruded strands were pelletized.

For comparison purposes, one composition (Comparative Example 1) was made by omitting the copolymer containing glycidyl groups and the ethylene based copolymer, three compositions (Comparative Examples 2, 3 and 4) were maded by omitting the ethylene base copolymer, and three compositions (Comparative Examples 5, 6 and 7) were made by omitting the copolymer containing glycidyl groups.

Melt viscosities of all the compositions were measured with koka type flow tester at 250° C. The results are presented in Table 1.

Subsequently, the pellets of the various compositions were injection molded at 250° C. (mold temperature: 80° C.) into ASTM D-638 type tensile properties testing specimens and ASTM D-256 type impact strength testing specimens in a 5 oz. screw in-line type injection molding machine. While injection molding, the minimum injection pressures and the melt viscosity of the resin were measured.

Tensile properties of the molded test specimens were measured at 23° C. and notched Izod impact strengths were measured at both 23° C. and −40° C. The same tests were performed after annealing for 400 hours at 130° C. in air. The results are presented in Table 1.

TABLE 1

|  | Examples | | | | Comparative Examples | | | | | | |
|---|---|---|---|---|---|---|---|---|---|---|---|
|  | 1 | 2 | 3 | 4 | 1 | 2 | 3 | 4 | 5 | 6 | 7 |
| Composition | | | | | | | | | | | |
| Poly(butylene terephthalate) (parts by weight) | 100 | 100 | 100 | 100 | 100 | 100 | 100 | 100 | 100 | 100 | 100 |
| Copolymer containing glycidyl groups (parts by weight) | A (10) | A (10) | A (10) | B (10) | — | A (10) | A (30) | B (20) | — | — | — |
| Ethylene based copolymer (parts by weight) | C (10) | C (20) | D (10) | C (10) | — | — | — | — | C (10) | C (30) | D (10) |
| Melt Viscosity ($10^4$ poise) | 0.95 | 0.82 | 1.0 | 0.97 | 0.58 | 1.6 | 5.2 | 3.4 | 0.55 | 0.51 | 0.53 |
| Minimum Injection Pressure (Kg/cm$^2$) | 37 | 35 | 38 | 38 | 31 | 47 | 83 | 65 | 30 | 28 | 29 |
| Mechanical Properties (Before Annealing) | | | | | | | | | | | |
| Tensile strength (Kg/cm$^2$) | 435 | 381 | 420 | 410 | 545 | 492 | 398 | 436 | 486 | 372 | 408 |
| Elongation at Break (%) | 200< | 200< | 200< | 200< | 96 | 127 | 200< | 200< | 65 | 34 | 42 |
| Notched Izod Impact Strength | | | | | | | | | | | |
| At 23° C. (Kg.cm/cm) | 29 | 37 | 25 | 32 | 3.5 | 9.1 | 30 | 19 | 3.7 | 3.2 | 3.3 |
| At −40° C. (Kg.cm/cm) | 16 | 19 | 13 | 16 | 3.0 | 4.6 | 8.1 | 5.8 | 3.3 | 3.0 | 2.8 |
| Mechanical Properties (After Annealing) | | | | | | | | | | | |
| Tensile Strength (Kg/Cm$^2$) | 446 | 395 | 433 | 425 | 553 | 506 | 410 | 449 | 500 | 365 | 402 |
| Elongation at Break (%) | 189 | 182 | 146 | 157 | 14 | 42 | 169 | 98 | 17 | 10 | 12 |
| Notched Izod Impact Strength | | | | | | | | | | | |
| At 23° C. (Kg.cm/cm) | 24 | 31 | 17 | 19 | 2.7 | 7.3 | 23 | 10 | 2.9 | 2.6 | 2.5 |
| At −40° C. (Kg.cm/cm) | 15 | 17 | 10 | 11 | 2.3 | 4.1 | 6.8 | 4.5 | 2.5 | 2.3 | 2.1 |

Notes:
A: ethylene/glycidyl methacrylate copolymer, 90/10 ratio by weight, MI = 3.
B: ethylene/glycidyl methacrylate/vinyl acetate copolymer, 85/10/5 ratio by weight, MI = 2.5.
C: ethylene/butene-1 copolymer, 85/15 ratio by mole, MI = 4.
D: ethylene/propylene copolymer, 70/30 ratio by mole, MI = 2.

The data in TABLE 1 demonstrates that in comparison with the compositions for which data appears under the heading "Comparative Examples", the compositions in accordance with the invention which comprise a polyester, a copolymer containing glycidyl groups and an ethylene based copolymer and for which data appears under the heading "Examples" have highly improved impact strength at low temperature and good flow properties for injection molding. Especially among the copolymers containing glycidyl groups, the ethylene/glycidyl methacrylate copolymer exhibits excellent properties while among the ethylene based copolymers the ethylene/butene-1 copolymer exhibits excellent properties.

EXAMPLE 5; COMPARATIVE EXAMPLES 8-10

A composition of 100 parts by weight of poly(butylene terephthalate) having a relative viscosity of 1.46, 40 parts by weight of glass fibers (CS-3PE-231, a product of "Nitto Boseki Co. Ltd."), 10 parts by weight of ethylene/glycidyl methacrylate copolymer (about 90/10 ratio by weight, MI=3) and 10 parts by weight of ethylene/butene-1 copolymer (85/15 ratio of mole, MI=4) was prepared and evaluated in the same manner as the compositions for which data is presented in Table 1. For comparison purposes, three compositions were made of poly(butylene terephthalate) but omitting the ethylene/glycidyl methacrylate copolymer and/or the ethylene/butene-1 copolymer components, as indicated in respective Comparative Examples 8, 9 and 10 in Table 2. These compositions were also evaluated in the same manner as the compositions for which data is presented in Table 1. The test results are presented in Table 2.

TABLE 2

|  | Example | Comparative Examples | | |
|---|---|---|---|---|
|  | 5 | 8 | 9 | 10 |
| Composition |  |  |  |  |
| Poly(butylene terephthalate) (parts by weight) | 100 | 100 | 100 | 100 |
| Ethylene/glycidyl methacrylate copolymer (parts by weight) | 10 | — | 20 | — |
| Ethylene/butene-1 copolymer (parts by weight) | 10 | — | — | 20 |
| Glass Fiber (parts by weight) | 40 | 40 | 40 | 40 |
| Minimum Injection Pressure (Kg/cm$^2$) | 35 | 28 | 59 | 27 |
| Notched Izod Impact Strength |  |  |  |  |
| At 23° C. (Kg.cm/cm) | 12.5 | 7.5 | 11.8 | 8.0 |
| At −40° C. (Kg.cm/cm) | 9.5 | 5.8 | 6.9 | 6.4 |

As indicated by the test results, compositions according to this invention have good impact strengths at low temperature and good flow properties upon injection molding.

We claim:

1. A polyester resinous composition comprising:
   (a) an aromatic polyester;
   (b) a copolymer containing glycidyl groups; and
   (c) a copolymer consisting essentially of ethylene and an α-olefin having more than three carbon atoms, wherein the molar copolyermization ratio of ethylene to α-olefin is in a range between 40/60 to 99/1; and
   wherein components (b) and (c) are each present in an amount from about 1 to 50 parts by weight per 100 parts by weight of said aromatic polyester (a).

2. The composition of claim 1, wherein component (a) is poly(alkylene terephthalate).

3. The composition of claim 2, wherein the poly(alkylene terephthalate) is poly(butylene terephthalate).

4. The composition of claim 1, wherein the sum of the amounts of component (b) and component (c) is from about 2 to 50 parts by weight per 100 parts by weight of the aromatic polyester of component (a).

5. The composition of claim 1, wherein weight ratio of the amount of the component (b) to the component (c) is in a range between about 1/9 to 8/2.

6. The composition of claim 1, wherein component (b) is a copolymer of an α-olefin and glycidyl ester of α,β-ethylenically unsaturated carboxylic acid.

7. The composition of claim 6, wherein the α-olefin in component (b) is ethylene.

8. The composition of claim 6, wherein a glycidyl ester of α,β-ethylenically unsaturated carboxylic acid in the component (b) is a member of the group consisting of a glycidyl methacrylate and a glycidyl acrylate.

9. The composition of claim 7 or 8, wherein component (b) is an ethylene/glycidyl methacrylate copolymer.

10. The composition of claim 1, wherein α-olefin in the component (c) is a member of the group consisting of propylene, butene-1 and hexene-1.

11. The composition of claim 10, wherein component (c) is an ethylene/butene-1 copolymer.

12. The composition of claim 6, wherein the polymerized amount of the glycidyl ester of α,β-ethylenically unsaturated carboxylic acid in the component (b) ranges from about 1 to 50% by weight.

13. The composition of claim 6, wherein the copolymerized amount of the glycidyl ester of α,β-ethylenically unsaturated carboxylic acid in the component (b) ranges from about 2 to 20% by weight.

14. The composition of claim 1, wherein copolymerization ratio of ethylene to α-olefin in the copolymer of component (c) ranges between 70/30 to 95/5.

15. The composition of claim 1, further comprising fibrous reinforcement material.

16. The composition of claim 1, further comprising granular reinforcement material.

17. The composition of claim 15 or 16, wherein the reinforcement material is up to 50% by weight of the composition.

18. The composition of claim 15 or 16, wherein said reinforcement material is selected from the group consisting of glass fiber, carbon fiber, metal fiber, glass bead, glass flake, wollastonite, mica, talc and clay.

19. The composition of claim 1, further comprising at least one additive material selected from the group consisting of tertiary amines, phosphites, phosphonium compounds, tertiary phosphines, metal salts of carboxylic acids, metal salts of sulfonic acids and organic sulfate salts.

20. The composition of claim 19, wherein content of the additive material is from about 0.01 to 5 parts by weight per 100 parts by weight of said aromatic polyester.

21. The composition of claim 1, further comprising up to 30% by weight, based on weight of the composition, of a halogenated organic compound and up to 20% by weight, based on weight of the composition, of antimony trioxide.

22. The composition of claim 21, wherein the halogenated organic compound has at least one benzene ring.

23. A process for preparing a polyester resinous composition comprising:
   (a) dry blending
      (i) an aromatic polyester,
      (ii) a copolymer containing glycidyl groups and
      (iii) a copolymer consisting essentially of ethylene and an α-olefin having more than three carbon atoms, wherein the molar copolyermization ratio of ethylene to α-olefin is in a range between 40/60 to 99/1; and
   wherein components (ii) and (iii) are each present in an amount from about 1 to 50 parts by weight per 100 parts by weight of said aromatic polyester (a),
   (b) melt mixing said dry blended components by use of a screw extruder at a temperature above the melting point of said aromatic polyester.

24. An injection molded article comprising:
   (a) an aromatic polyester;
   (b) a copolymer containing glycidyl groups; and
   (c) a copolymer consisting essentially of ethylene and an α-olefin having more than three carbon atoms, wherein the molar copolymerization ratio of ethylene to α-olefin is in the range between 40/60 to 99/1; and
   wherein components (b) and (c) are each present in an amount from about 1 to 50 parts by weight per 100 parts by weight of said aromatic polyester (a).

25. An extrusion molded article comprising:
   (a) an aromatic polyester;
   (b) a copolymer containing glycidyl groups; and (c) a copolymer consisting essentially of ethylene and an α-olefin having more than three carbon atoms, wherein the molar copolymerization ratio of ethylene to α-olefin is in a range between 40/60 to 99/1; and wherein components (b) and (c) are each present in an amount from about 1 to 50 parts by weight per 100 parts by weight of said aromatic polyester (a) in a shape selected from the group consisting of films and rods.

* * * * *